United States Patent [19]

Richards et al.

[11] 4,216,588

[45] Aug. 12, 1980

[54] MARKING PEN HOLDER

[75] Inventors: William Richards, Medway; Bernard Grolman, Worcester, both of Mass.

[73] Assignee: American Optical Corporation, Southbridge, Mass.

[21] Appl. No.: 951,555

[22] Filed: Dec. 6, 1978

[51] Int. Cl.² .................... B43L 13/00; B25D 5/00
[52] U.S. Cl. ................................. 33/189; 33/41 F; 33/18 R
[58] Field of Search ............ 33/41 F, 39 B, 18 R, 33/189 R, 191, 200, 174 A, 28; 351/5; 401/48, 6, 259, 260

[56] References Cited

U.S. PATENT DOCUMENTS

| 544,600 | 8/1895 | Stevens | 33/41 F |
|---|---|---|---|
| 888,377 | 5/1908 | Wood | 33/189 |

FOREIGN PATENT DOCUMENTS

| 132821 | 7/1902 | Fed. Rep. of Germany . | |
| 199599 | 6/1908 | Fed. Rep. of Germany . | |
| 125502 | 5/1928 | Switzerland | 33/41 F |
| 4357 | of 1877 | United Kingdom | 401/48 |

*Primary Examiner*—Harry N. Haroian
*Attorney, Agent, or Firm*—Jeremiah J. Duggan; Alan H. Spencer; Stephen A. Schneeberger

[57] ABSTRACT

A holder for a lens-marking pen attachable to the pen oppositely of its working end and having a rest in the form of a spring arm adapted to extend along a side of the pen to a bifurcated termination straddling the pen's marking tip and resiliently biasing the tip away therefrom. In its function as a pen rest, the bifurcation of the spring is placed against a lens or other surface to be marked for steadying the pen which may then be depressed to bring its marking tip into contact with the surface between legs of the bifurcation.

3 Claims, 3 Drawing Figures

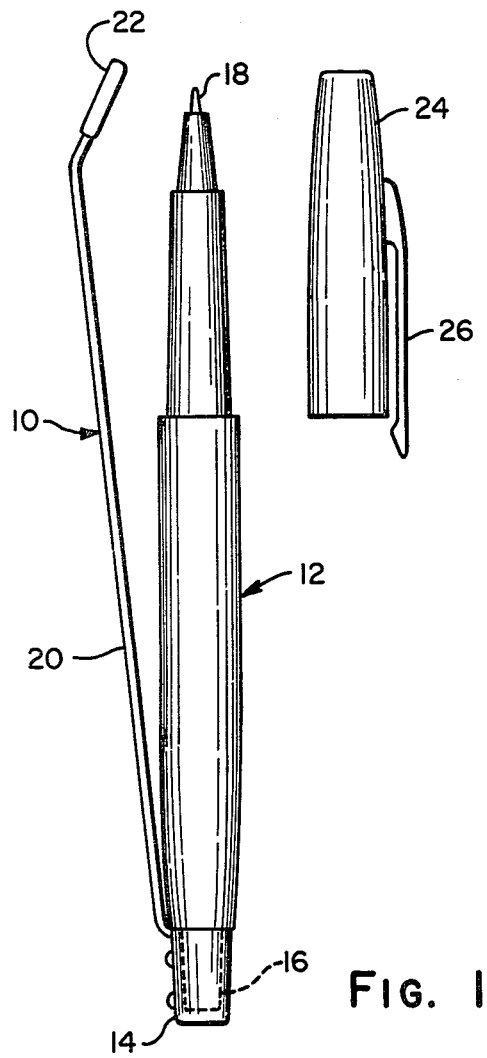
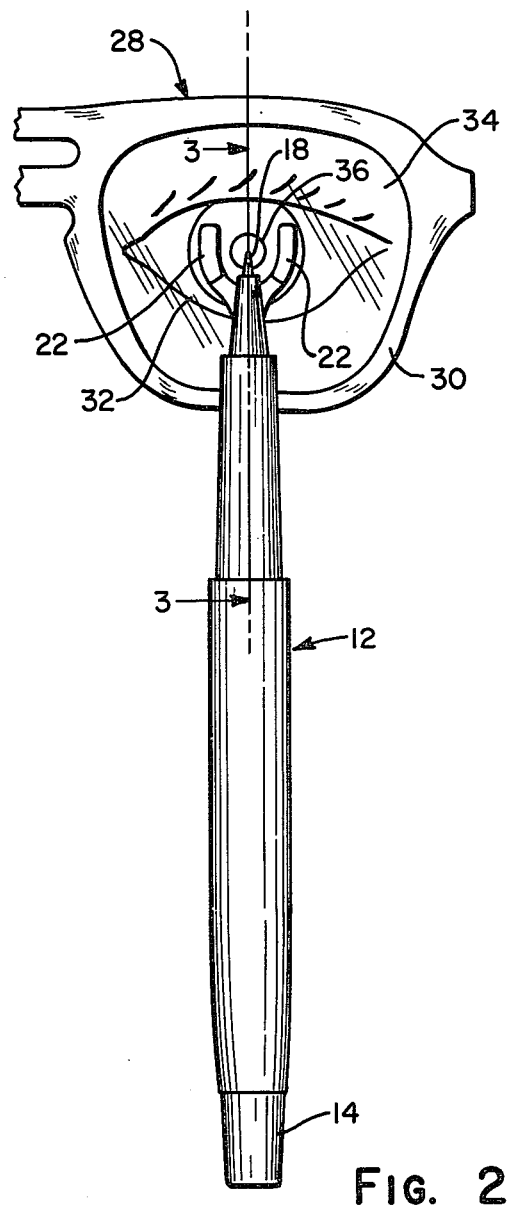
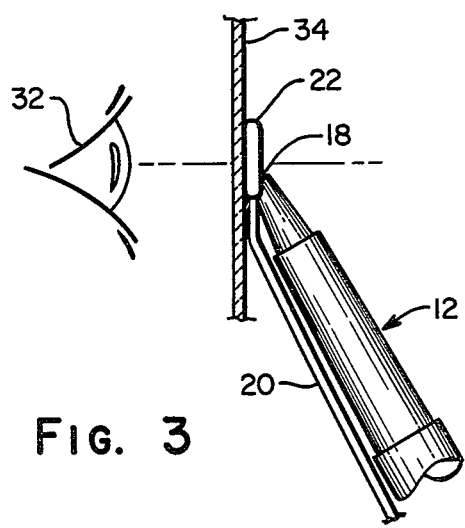
FIG. 1
FIG. 2
FIG. 3

MARKING PEN HOLDER

BACKGROUND OF THE INVENTION

1. Field of the Invention

Marking pen holders with particular reference to markers used in the fitting of spectacles lenses.

2. Discussion of the Prior Art

In the fitting of spectacles lenses, it is necessary to accurately position the lens' optical reference (e.g. optical center) relative to the patient's pupil for optimum lens-eye performance. This requires that the optical center (OC) be so positioned that the lens optical axis passes through the center of rotation (CR) of the eye. For example, for distance viewing the OC's lateral disposition depends upon monocular pupillary distance (PD). The OC's vertical disposition is dependent upon the stop position distance (SPD), i.e. the rear lens vertex to CR distance, and the pantoscopic angle (PA). For normal SPD's, the trigonometric relationship dictates that for each two degrees of PA the OC be decentered down approximately 1 mm from the pupil center (with the eye in its primary gaze posture). For a 10° PA, the OC should be decentered down approximately 5 mm from the pupil center.

Accordingly, in order to satisfy the requisites of optimal fitting, it is necessary to first establish the location of the pupil center projection, i.e. within an empty frame's eyewire (lens rim). One of the practiced techniques entails attaching a clear plastic membrane, e.g. cellophane tape, to each eyewire so that it will encompass the intercept of the pupil center projection. Then, while employing a fixation technique to insure the patient's parallel primary viewing, the pupil centers are marked on the tape. These markings may then be measured using the well-known frame boxing references.

While the foregoing technique may be simple in concept, it is difficult in practice to mark the pupil center accurately. The difficulty arises from prematurely or accidentally touching the surface to be marked as a result of the fitter heretofor having to observe the patient's pupil without the assistance of a hand rest or reference to stabilize or control the marking pen.

These difficulties are circumvented by the present invention which has a principal objective of providing means for stabilizing a marking pen prior to and during marking therewith.

Another object is to provide a pen rest adaptable to pen replacement and having convenient pocket portability.

Still another object is to provide a highly practical and efficient marking pen stabilizer of uniquely simple design and inexpensive construction.

Other objects and advantages of the invention will become apparent from the following description.

SUMMARY OF THE INVENTION

The aforesaid objects and their corollaries are accomplished by provision of a pen holder having a cap adapted to removably snugly fit over the end of a marking pen oppositely of its marking tip and a spring arm adapted to extend along a side of the pen to a bifurcated termination straddling the marking tip and resiliently biasing the tip away therefrom. In its function as a pen rest, the bifurcation of the spring is placed against a lens or other surface to be marked for steadying the pen which may then be depressed to bring its marking tip into contact with the surface between legs of the bifurcation. By such means, the fitter is able to concentrate his gaze upon the patient's pupil and determine the proper location for marking without difficulty in stabilizing the pen for marking. This avoids premature or otherwise undesired touching of the surface to be marked with the marking tip.

Being of simple, slim construction and permitting conventional capping of the marking tip of the pen when not in use, the present pen holder with pen attached becomes conveniently pocket portable using the usual pen pocket clip.

Details of the invention will become more readily apparent from the following description when taken in conjunction with the accompanying drawings.

DESCRIPTION OF THE DRAWINGS

FIG. 1 is a side elevational view of a preferred embodiment of the present pen holder illustrated in a position of use upon an uncapped marking pen;

FIG. 2 illustrates, in front elevation, a use of the embodiment of the invention shown in FIG. 1; and FIG. 3 is a fragmentary side elevational view taken generally along line 3—3 of FIG. 2.

DESCRIPTION OF A PREFERRED EMBODIMENT

Referring to the drawings, holder 10 for pen 12 comprises end cap 14 adapted to receive and fit snugly over the end 16 of pen 12 oppositely of its marking tip 18. Fixed to and extending away from cap 14 is spring arm 20 which terminates with a bifurcation providing legs 22 adapted to straddle marking tip 18 when pen 12 is put to use, e.g. as in FIGS. 2 and 3. Legs 22 are preferably at least partially coated or otherwise covered with a soft or rubber-like resin or plastic to prevent marring of a surface contacted thereby and/or to avoid accidental displacement by slippage during a marking operation.

Spring arm 20, being biased away from the working end of pen 12 (e.g. as illustrated in FIG. 1), prevents unwanted marking by tip 18 during alignment of pen 12 for a marking operation and further permits the usual cap 24 (FIG. 1) to be applied to the pen during nonuse thereof. This renders the pen and pen holder combination readily pocket portable using clip 26 in the usual fashion.

Referring more particularly to FIGS. 2 and 3 wherein a spectacles frame 28 having lens rim 30 is illustrated as being positioned before a patient's eye 32, pen holder 10 with pen 12 affixed thereto is used as follows:

With a clear plastic membrane, e.g. cellophane tape or a trial lens 34, extended over the intercept of the center projection of pupil 36 through rim 30, legs 22 of spring arm 20 are placed against the cellophane tape or lens 34 straddling the pupil's center projection for clear viewing thereof and steadying of pen 12 prior to marking therewith. Upon aligning marking tip 18 with the pupil center (or another reference point relative thereto) marking of the cellophane tape or lens 34 is accomplished simply by pressing tip 18 against the tension of spring 20 into contact with the cellophane tape or lens 34.

The intercept of the pupil center projection with the cellophane tape or lens 34 having been so marked, measurements to extreme lateral and inferior points on lens rim 34 may be made for use in ophthalmic lens layout. The well-known boxing technique described in U.S.

Pat. No. 4,055,900 would ordinarily be used. It should be understood, however, that the present pen holder and pen combination may be used in conjunction with the locating of multifocal segments of ophthalmic lenses and/or in any instance where the steadying of a pen can facilitate a marking operation.

It should also be appreciated that there are various other modifications and/or adaptations of the precise form of the invention here shown. For example, cap 16 and spring arm 20 may comprise a one-piece construction wherein the cap is formed from an enlargement of the corresponding end of spring arm 20. Accordingly, the foregoing illustrations are not to be interpreted as restrictive of the invention beyond that necessitated by the following claims.

We claim:

1. A marker comprising the combination of:
   a pen having a marking tip at one of its ends; and
   a long and relatively slender spring arm having one end attached to an end of said pen oppositely of said marking tip, said arm extending along a side of said pen to a termination adjacent said marking tip, said termination being in the form of a bifurcation having a pair of legs straddling said marking tip, said bifurcation normally being resiliently biased away from said marking tip whereby said spring arm provides a rest for steadying said pen prior to and during performance of a marking operation, the latter being effected by pressing said marking tip towards said bifurcation.

2. A marker according to claim 1 wherein said spring arm is attached to said pen by means of a hollow cap adapted to fit over said end of said pen oppositely of its marking tip, said spring arm being affixed to said cap.

3. A marker according to claim 1 wherein portions of said legs of said bifurcation of said spring arm are covered with cushioning means.

* * * * *